US012674329B2

(12) United States Patent
Chang et al.

(10) Patent No.: US 12,674,329 B2
(45) Date of Patent: Jul. 7, 2026

(54) PANEL AND PANEL SYSTEM FOR COVERING A SURFACE

(71) Applicant: ARMSTRONG WORLD INDUSTRIES, INC., Lancaster, PA (US)

(72) Inventors: Ying Chang, Lancaster, PA (US); Alan Brian, Mount Joy, PA (US); Robert A. Duschl, Lititz, PA (US); Edward Roberts, York, PA (US); Carlos X. Medina, Lancaster, PA (US); Ronnie Massey, Wrightsville, PA (US); Amber C. Arnold, Lancaster, PA (US); Philip Weber, Mountville, PA (US)

(73) Assignee: AWI Licensing LLC, Wilmington, DE (US)

( * ) Notice: Subject to any disclaimer, the term of this patent is extended or adjusted under 35 U.S.C. 154(b) by 422 days.

(21) Appl. No.: 17/963,571

(22) Filed: Oct. 11, 2022

(65) Prior Publication Data

US 2024/0141653 A1 May 2, 2024

Related U.S. Application Data

(60) Provisional application No. 63/254,422, filed on Oct. 11, 2021.

(51) Int. Cl.
*E04F 13/08* (2006.01)
*B32B 3/06* (2006.01)
(Continued)

(52) U.S. Cl.
CPC ............ *E04F 13/0866* (2013.01); *B32B 3/06* (2013.01); *B32B 3/30* (2013.01); *B32B 7/12* (2013.01);
(Continued)

(58) Field of Classification Search
CPC .... B32B 3/06; B32B 3/30; B32B 7/12; B32B 27/20; B32B 27/304; B32B 2264/104;
(Continued)

(56) References Cited

U.S. PATENT DOCUMENTS 5,081,812 A 1/1992 Reynolds
6,479,140 B1 11/2002 Takao
(Continued)

FOREIGN PATENT DOCUMENTS

GB 1570177 A 6/1980

*Primary Examiner* — James J Buckle, Jr.
(74) *Attorney, Agent, or Firm* — Patrick Sheldrake

(57) ABSTRACT

A panel which may be used as a part of a surface covering system, such as that for a wall or a ceiling, and which is useful to provide easy installation, durability, beneficial fire preventive performance, resistance to mold growth, and resistance to moisture. The panels may have a first major surface, a second major surface opposite the first major surface, and a side surface extending between the first and second major surfaces. The panel may be formed from polyvinyl chloride present in an amount from about 45 to about 70 wt. %; carbonate present in an amount from about 10 to about 31 wt. %; stearate present in an amount from about 1 to about 6 wt. %; and aluminum hydroxide present in an amount from about 10 to about 30 wt. %.

17 Claims, 8 Drawing Sheets

(51) Int. Cl.

| | |
|---|---|
| *B32B 3/30* | (2006.01) |
| *B32B 7/12* | (2006.01) |
| *B32B 27/20* | (2006.01) |
| *B32B 27/30* | (2006.01) |

(52) U.S. Cl.
CPC ............ *B32B 27/20* (2013.01); *B32B 27/304* (2013.01); *E04F 13/0871* (2013.01); *B32B 2264/1022* (2020.08); *B32B 2264/1023* (2020.08); *B32B 2264/104* (2013.01); *B32B 2264/108* (2013.01); *B32B 2307/4026* (2013.01); *B32B 2607/00* (2013.01); *E04F 13/0885* (2013.01); *E04F 2201/0123* (2013.01); *E04F 2201/023* (2013.01); *E04F 2201/043* (2013.01)

(58) Field of Classification Search
CPC ...... B32B 2264/108; B32B 2264/1022; B32B 2264/1023; B32B 2607/00; E04F 13/0866; E04F 13/0885; E04F 2201/0123; E04F 2201/023; E04F 2201/043
USPC .......................................................... 52/313
See application file for complete search history.

(56) References Cited

U.S. PATENT DOCUMENTS

| | | | |
|---|---|---|---|
| 6,617,009 | B1 | 9/2003 | Chen |
| 6,986,934 | B2 | 1/2006 | Chen |
| 9,234,357 | B2 | 1/2016 | Dossche |
| 9,938,717 | B2 | 4/2018 | Gaydos |
| 10,704,269 | B2 | 7/2020 | Whispell |
| 10,781,590 | B2 | 9/2020 | Duschl |
| 2006/0159890 | A1 | 7/2006 | Curatolo |
| 2009/0126307 | A1 | 5/2009 | Grohman |
| 2009/0223162 | A1 | 9/2009 | Chen |
| 2009/0308001 | A1* | 12/2009 | Wu .................... E04F 13/0885 52/173.3 |
| 2011/0113712 | A1 | 5/2011 | Liu |
| 2016/0273217 | A1 | 9/2016 | Huntzinger |
| 2017/0137613 | A1 | 5/2017 | Andrews |
| 2017/0313839 | A1 | 11/2017 | Guo |
| 2018/0002932 | A1 | 1/2018 | Van Giel |
| 2020/0199886 | A1 | 6/2020 | Van Giel |
| 2021/0123244 | A1 | 4/2021 | Boucke |

* cited by examiner

PANEL AND PANEL SYSTEM FOR COVERING A SURFACE

CROSS REFERENCE TO RELATED APPLICATIONS

The present application claims the benefit of priority to U.S. Provisional Patent Application Ser. No. 63/254,422, filed Oct. 11, 2021, the entirety of which is incorporated herein by reference.

FIELD OF THE DISCLOSURE

The present disclosure relates to planks, panels and surface covering systems using such planks for use in building materials. The inventive planks exhibit mold growth resistance and provide for beneficial fire resistant qualities.

BACKGROUND

Surface coverings are used for a variety of reasons, including to cover up imperfections in an underlying surface, to display a desired aesthetic, and to introduce acoustical solutions, such as providing beneficial sound absorption. Examples of such surface coverings include flooring that covers a subfloor, ceiling planks or panels that cover a ceiling or plenum, and wall planks or panels that cover a wall. Such surface coverings may be provided in various shapes, sizes, and forms in order to meet aesthetic and acoustical requirements.

Utilization of decorative surface coverings with printed decorations are known. Non-limiting examples of materials used to make such surface coverings include paper-based, polymer-based, and/or wood-based components. Polymer-based surface coverings may typically be made from rubber, polyolefins, polyesters, polyamides or polyvinyl chloride (PVC).

However, in addition to providing aesthetic value, surface coverings must also provide for functional aspects. For example, surface coverings having fire resistant properties, mold growth inhibition, durability, impact resistance, and/or resistivity to moisture and water would be beneficial. Furthermore, it would be beneficial to obtain surface coverings which provide for robust usability, such as use as an indoor or outdoor covering.

Thus, there is a need for improved surface coverings having robust durability and usability without compromising water sensitivity, mold growth, or fire preventive properties. Embodiments of the present invention are directed to meeting these needs.

SUMMARY

This summary is intended merely to introduce a simplified summary of some aspects of one or more implementations of the present disclosure. Further areas of applicability of the present disclosure will become apparent from the detailed description provided hereinafter. This summary is not an extensive overview, nor is it intended to identify key or critical elements of the present teachings, nor to delineate the scope of the disclosure. Rather, its purpose is merely to present one or more concepts in simplified form as a prelude to the detailed description below.

Applicants have discovered panel and/or plank compositions beneficial for use as a wall or ceiling surface covering for both indoor and outdoor applications. Such panels also provide for beneficial fire preventive characteristics, water resistance, and mold growth resistance.

Thus, in certain embodiments, the present invention provides a panel comprising a first major surface opposite a second major surface and a side surface extending therebetween, the panel comprising polyvinyl chloride present in an amount from about 45 to about 70 wt. %; carbonate present in an amount from about 10 to about 31 wt. %; stearate present in an amount from about 1 to about 6 wt. %; and aluminum hydroxide present in an amount from about 10 to about 30 wt. %. In certain embodiments, the polyvinyl chloride is present in an amount from about 50 to about 65 wt. %. In certain embodiments, the carbonate is selected from one or more alkali metal carbonates, alkaline earth metal carbonates, and a mixture thereof. In certain embodiments, the carbonate is selected from sodium carbonate, potassium carbonate, calcium carbonate, calcium magnesium carbonate, iron carbonate, and mixtures thereof. In certain embodiments, the weight ratio of alkaline earth carbonate to alkali carbonate is from about 10:1 to about 300:1. In certain embodiments, the carbonate is a mixture of calcium carbonate and sodium carbonate. In certain embodiments, the stearate is selected from one or more of alkaline earth metal stearate, divalent transition metal stearate, and mixtures thereof. In certain embodiments, the stearate is selected from calcium stearate, magnesium stearate, zinc stearate, copper stearate, nickel stearate, manganese stearate, and mixtures thereof. In certain embodiments, the weight ratio of alkaline earth metal stearate to divalent transition metal stearate is from 1:1 to 50:1, from about 15:1 to about 40:1, from about 17:1 to about 35:1, or from about 20:1 to about 30:1. In certain embodiments, the stearate is a mixture of calcium stearate and zinc stearate. In certain embodiments, the aluminum hydroxide is present in an amount from about 10 to about 25 wt. %. In certain embodiments, the panel further comprises a pigment. In certain embodiments, the pigment is titanium dioxide or carbon black. In certain embodiments, the pigment is present in an amount from about 1 to about 10 wt. %. In certain embodiments, the panel is a wall or ceiling panel. The panel may be referred to herein as a plank, although the panel may not be limited to a particular shape or size. In certain embodiments, the panel has a density of from about 0.3 $g/cm^3$ to about 1.5 $g/cm^3$. In certain embodiments, the invention is a method for reducing mold growth, the method comprising use of the panel as described in any of the embodiments herein. In other embodiments, the invention is a method for providing fire resistance, the method comprising use of the panel as described in any of the embodiments herein. In other embodiments, the invention is a ceiling system comprising the panel as described in any of the embodiments herein. In other embodiments, the invention is a surface covering system comprising use of the panel as described in any of the embodiments herein.

In other embodiments, the invention relates to a surface covering system comprising a system of panels which may have a tongue and groove structure. In certain embodiments, each panel may comprise polyvinyl chloride present in an amount from about 45 to about 70 wt. %; carbonate present in an amount from about 10 to about 31 wt. %; stearate present in an amount from about 1 to about 6 wt. %; and aluminum hydroxide present in an amount from about 10 to about 30 wt. %. In certain embodiments, the polyvinyl chloride is present in an amount from about 50 to about 65 wt. %. In certain embodiments, the carbonate is selected from one or more alkali carbonates, alkaline earth carbonates, or a mixture thereof. In certain embodiments, the carbonate is selected from sodium carbonate, potassium carbonate, calcium carbonate, calcium magnesium carbonate, iron carbonate, and mixtures thereof. In certain embodiments, the weight ratio of alkaline earth carbonate to alkali carbonate is from about 10:1 to about 300:1. In certain embodiments, the carbonate is a mixture of calcium carbonate and sodium carbonate. In certain embodiments, the stearate is selected from one or more of alkaline earth metal stearate, divalent transition metal stearate, or combinations thereof. In certain embodiments, the stearate is selected from calcium stearate, magnesium stearate, zinc stearate, copper stearate, nickel stearate, manganese stearate, or combinations thereof. In certain embodiments, the weight ratio of alkaline earth metal stearate to divalent transition metal stearate is from 1:1 to 50:1, from about 15:1 to about 40:1, from about 17:1 to about 35:1, or from about 20:1 to about 30:1. In certain embodiments, the stearate is a mixture of calcium stearate and zinc stearate. In certain embodiments, the aluminum hydroxide is present in an amount from about 10 to about 25 wt. %. In certain embodiments, the panel further comprises a pigment. In certain embodiments, the pigment is titanium dioxide or carbon black. In certain embodiments, the pigment is present in an amount from about 1 to about 10 wt. %. In certain embodiments, the panel has a density of from about 0.3 $g/cm^3$ to about 1.5 $g/cm^3$. In certain embodiments, the invention is a method for reducing mold growth, the method comprising use of the surface covering system of any embodiment described herein. In certain embodiments, the invention is a method for providing fire resistance, the method comprising use of the surface covering system of any embodiment described herein.

In certain embodiments, the surface covering system further comprises an adhesive tape configured to couple the panels to a substrate, the adhesive tape comprising a substrate-side adhesive component comprising at least one adhesive layer; a panel-side adhesive component comprising at least one adhesive layer; and a release component; wherein the panels are coupled to the substrate by the adhesive tape in a side-by-side arrangement to cover the substrate, the at least one adhesive layer of the substrate-side adhesive component being adhered to the substrate, the at least one adhesive layer of the panel-side adhesive component being adhered to the rear surfaces of the panels, and the release component being positioned between the substrate-side adhesive component and the panel-side adhesive component. In certain embodiments, the adhesive tape is configured to detachably couple the panels to the substrate. In certain embodiments, the panels are coupled to the substrate using screws, clips, or a combination thereof.

In certain embodiments, the surface covering system further comprises an adhesive tape configured to couple the panels to a substrate, the adhesive tape comprising: one or more selected from a panel-side adhesive component comprising at least one adhesive layer and a substrate-side adhesive component comprising at least one adhesive layer; and a release component; wherein the panels are coupled to the substrate by the adhesive tape in a side-by-side arrangement to cover the substrate, wherein the at least one adhesive layer of the panel-side adhesive component, if present, is adhered to the rear surfaces of the panels, wherein the at least one adhesive layer of the substrate-side adhesive component, if present, is adhered to the substrate, and wherein the release component is positioned between the substrate and panel-side adhesive component when only the panel-side adhesive component is present, between the panel and substrate-side adhesive component when only the substrate-side adhesive component is present, or between the substrate-side adhesive component and the panel-side adhesive component when both components are present. In certain embodiments, the adhesive tape is configured to detachably couple the panels to the substrate. In certain embodiments, the panels are coupled to the substrate using screws, clips, or a combination thereof.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The detailed description of the invention will be better understood when read in conjunction with the appended drawings. It should be understood, however, that the invention is not limited to the precise arrangements and instrumentalities of the embodiments shown in the drawings.

DETAILED DESCRIPTION

Figure 1:
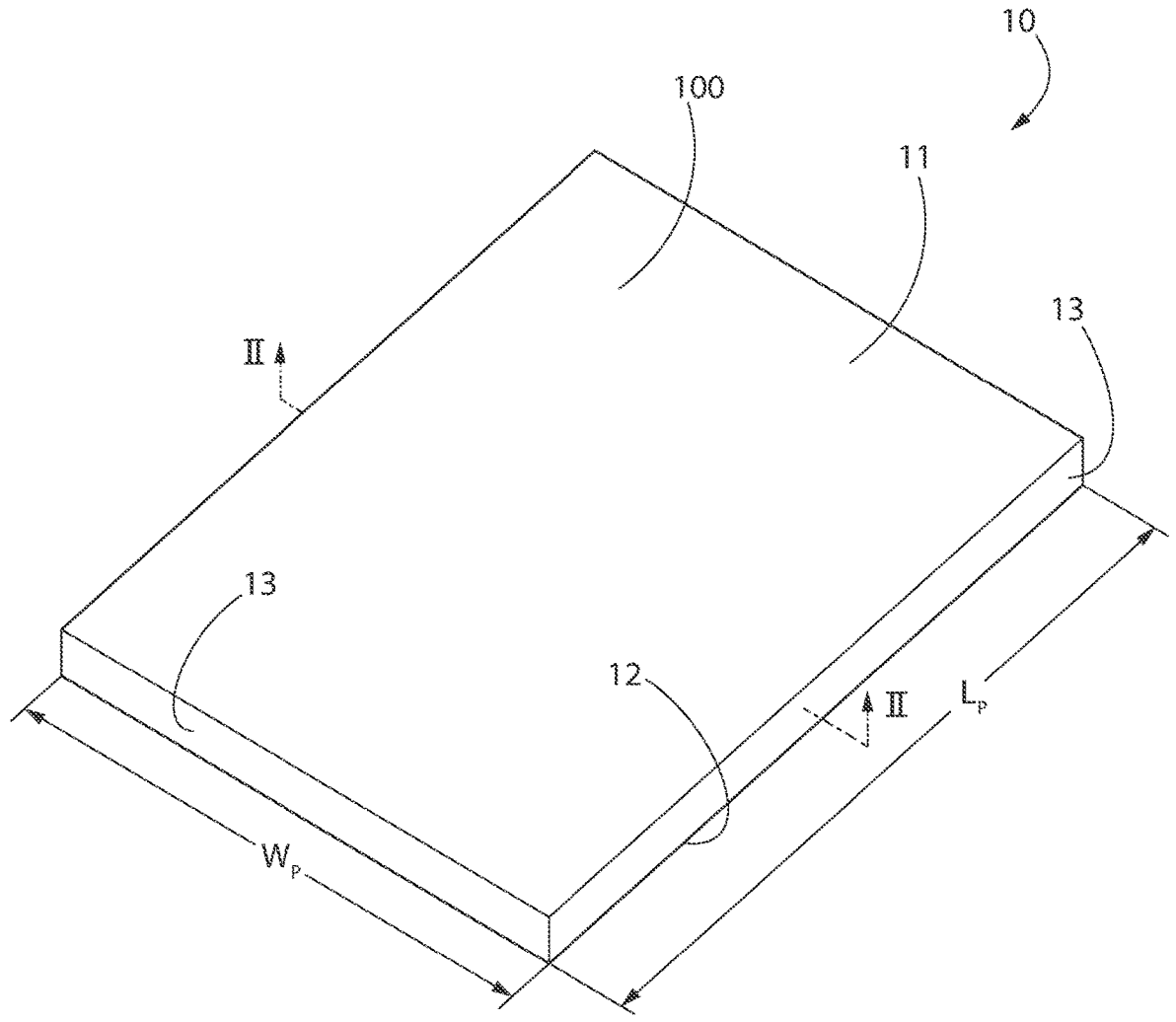
FIG. 1 is a top perspective view of a panel according to one embodiment of the invention.

For illustrative purposes, the principles of the present invention are described by referencing various exemplary embodiments thereof. Although certain embodiments of the invention are specifically described herein, one of ordinary skill in the art will readily recognize that the same principles are equally applicable to, and can be employed in other applications and methods. It is to be understood that the invention is not limited in its application to the details of any particular embodiment shown. The terminology used herein is for the purpose of description and not to limit the invention, its application, or uses.

As used herein and in the appended claims, the singular forms "a", "an", and "the" include plural references unless the context dictates otherwise. The singular form of any class of the ingredients refers not only to one chemical species within that class, but also to a mixture of those chemical species. The terms "a" (or "an"), "one or more" and "at least one" may be used interchangeably herein. The terms "comprising", "including", "containing", and "having" may be used interchangeably. The term "include" should be interpreted as "include, but are not limited to". The term "including" should be interpreted as "including, but are not limited to."

As used throughout, ranges are used as shorthand for describing each and every value that is within the range. Any value within the range can be selected as the terminus of the range. Unless otherwise specified, all percentages and amounts expressed herein and elsewhere in the specification should be understood to refer to percentages by weight of the total composition. Unless otherwise specified, reference to a molecule, or to molecules, being present at a "wt. %" refers to the amount of that molecule, or molecules, present in the composition based on the total weight of the composition.

According to the present application, use of the term "about" in conjunction with a numeral value refers to a value that may be +/−5% of that numerical value. As used herein, the term "substantially free" is intended to mean an amount less than about 5.0 wt. %, less than 3.0 wt. %, 1.0 wt. %; preferably less than about 0.5 wt. %, and more preferably less than about 0.25 wt. % of the composition.

Unless defined otherwise, all technical and scientific terms used herein have the same meanings as commonly understood by one of ordinary skill in the art to which this invention belongs. All patents, patent applications, publications, and other references cited or referred to herein are incorporated by reference in their entireties for all purposes. In the event of a conflict in a definition in the present disclosure and that of a cited reference, the present disclosure controls.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing (if applicable) under discussion. These relative terms are for convenience of description only and, unless specified otherwise, do not require that the apparatus be constructed or operated in a particular orientation.

As used herein, terms such as "attached," "affixed," "connected," "coupled," "interconnected," and the like refer to a relationship wherein structures are secured or attached to one another either directly or indirectly through intervening structures, as well as both movable or rigid attachments or relationships, unless expressly described otherwise. Accordingly, the disclosure is not limited to such exemplary embodiments illustrating certain combinations of features that may exist alone or in combination with other features.

The present disclosure is directed towards panels and surface covering systems using such panels. The panels and surface covering systems are useful to provide beneficial aesthetic and functional properties. In certain aspects, such panels and systems impart one or more of fire resistance, water resistivity, and mold resistance properties. The panels may be described herein as planks, and in one particular embodiment the panels described herein may be planks. However, the panels are not limited to any particular shape unless specifically claimed as such. Thus, while the term plank is defined as a long, thin piece of timber used in building and flooring, the invention is not limited to a panel structure which is long and thin (i.e., rectangular) in all embodiments. While a rectangular shape may be preferred for the panel in some embodiments, the invention is not to be so limited and the panels described herein may take on other shapes, including square, other polygonal shapes, irregular shapes, or the like.

Referring to FIG. 1, a panel 10 is illustrated in accordance with one embodiment of the present invention. According to one embodiment, the panel 10 may comprise a first major surface 11, a second major surface 12 opposite the first major surface 11, and a side surface 13 extending between the first and second major surfaces 11, 12. The side surface 13 may also be referred to herein as a peripheral surface or a peripheral edge. The panel 10 may have a body thickness that is measured by the distance between the first major surface 11 and the second major surface 12. In this depiction, the panel 10 may have a rectangular shape having a length $L_P$ and a width $W_P$, with the length $L_P$ being greater than the width $W_P$. However, the invention is not to be so limited in all embodiments and the panel 10 may have other shapes in other embodiments, including square, triangular, other polygonal shapes, and even irregular shapes. A ceiling system may even include several panels having different shapes, so long as the shapes intermesh and mate with one another to form a reasonably seamless full coverage wall or ceiling covering system.

The panel 10 may comprise a body 100. The body 100 of the panel 10 may be a monolithic, integral structure which is formed by an extrusion process. Other processes for forming the body 100 of the panel 10 may also be used, including injection molding, additive manufacturing, subtractive manufacturing, or the like. The panel 10 or the body 100 thereof may be homogenous in some embodiments. In certain embodiments, the panel 10 may also comprise a coating which covers one or more of the first major surface 11, the second major surface 12, and/or the side surface 13 of the panel 10. In other embodiments, the panel 10 may comprise a scrim which may cover one or more of the first major surface 11, the second major surface 12, and/or the side surface 13 of the panel 10. The coating and/or scrim may be used for various purposes, including aesthetics, fire protection, acoustic enhancements, or the like.

Figure 2:
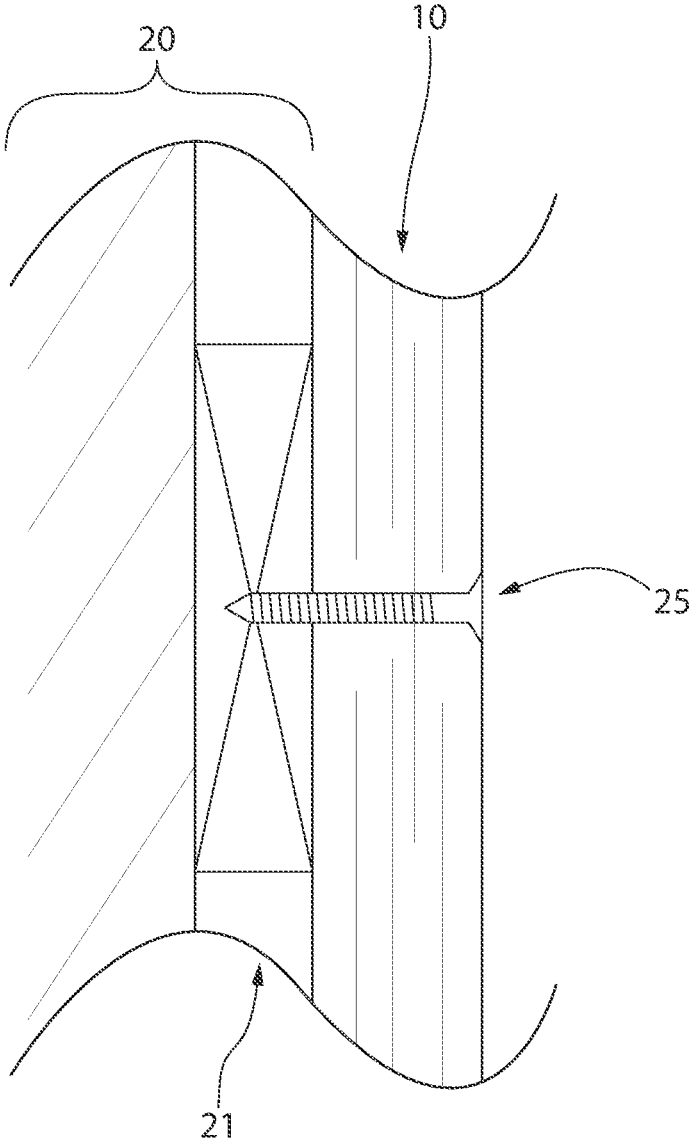
FIG. 2 is a schematic side view of a surface covering system according to one embodiment of the invention, illustrating the panel of FIG. 1 being attached to a furring strip or other support surface.
Figure 3:
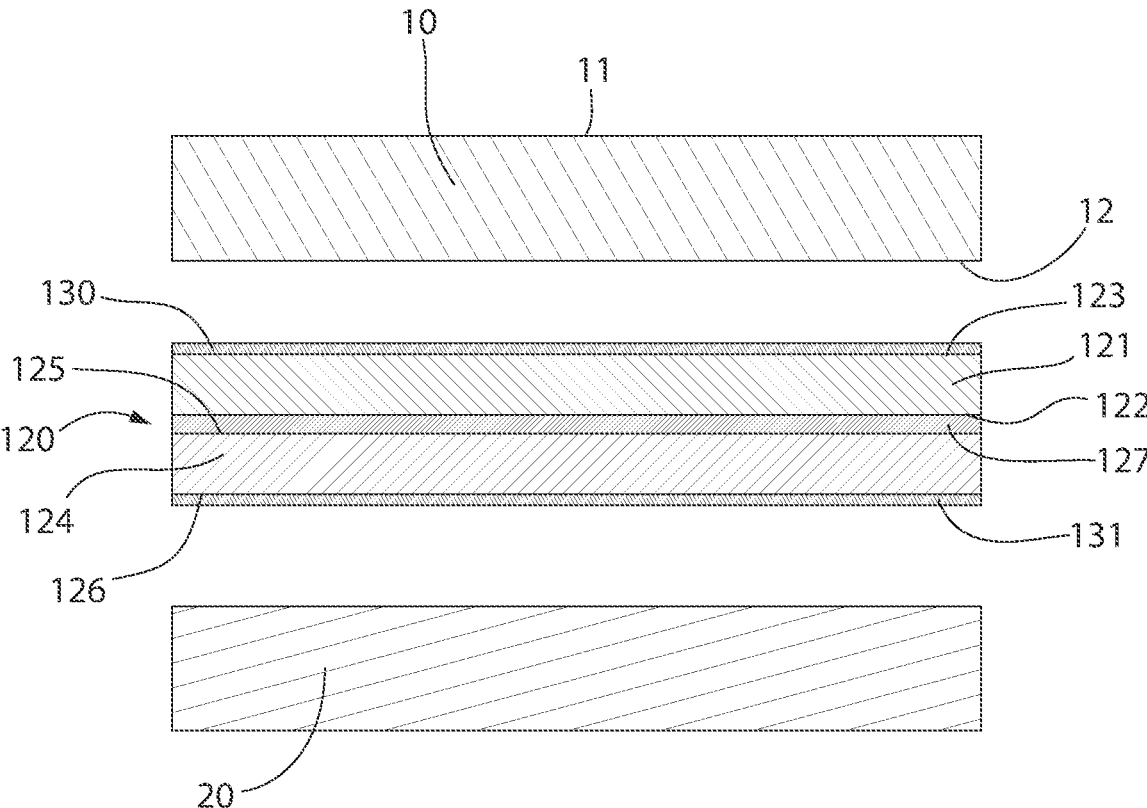
FIG. 3 is a schematic view of a surface covering system according to one embodiment of the invention, illustrating a panel, an adhesive tape, and a substrate.

Referring to FIG. 2, the panel 10 may be directly attached to a substrate 20 by use of an attaching means 25. In this non-limiting depiction, the panel 10 is attached to the substrate 20 with use of a screw as an attaching means 25. In other non-limiting embodiments, an adhesive or tape may be utilized to attach the panel 10 to the substrate 20. In this non-limiting depiction, the substrate 20 comprises a furring strip 21. The substrate 20 may also, or alternatively, comprise drywall, gypsum board, plywood, or the like which forms the basic structure for a wall or ceiling, Referring to FIG. 3, the panel 10 may be detachably coupled, or attached, to a substrate 20 by use of an adhesive tape 120. Although FIG. 3 only illustrates one panel 10 being coupled to the substrate 20, in certain embodiments a surface covering system may comprise a plurality of the panels 10, each of which may be detachably coupled to the substrate 20 (see, for example, FIG. 4). Thus, in accordance with certain aspects of the invention set forth herein, a plurality of panels 10 may be coupled to the substrate 20 using the adhesive tape 120, as discussed more fully herein. Specifically, a plurality of panels 10 may be detachably coupled to the substrate 20 (using the adhesive tape 120) in a side-by-side arrangement so that the panels 10 collectively cover the substrate 20. As used herein, covering the substrate 20 includes partially covering the substrate 20 and/or covering an entirety of the substrate 20. A user can cover as much of the substrate 20 as he/she desires using one or more of the acoustic building panels 10 and the installation techniques described herein. Although the adhesive tape 120 is illustrated in FIG. 3 and described herein as the mechanism by which the panels 10 may be coupled or otherwise attached or affixed or adhered to the substrate 20, the invention is not to be so limited in all embodiments. In alternative embodiments the panels 10 may be coupled to the substrate 20 via liquid adhesive such as glue or epoxy, or hardware such as screws, nails, bolts, or the like.

The substrate 20 may be any surface that is desirable to cover with one or more of the panels 10. For example, the substrate 20 may be a wall to which panels 10 are attached, or a ceiling to which panels 10 are attached. The substrate 20 may be an interior wall (such as drywall, wood, or the like) or an exterior wall (such as siding, stucco, concrete, brick, wood, or the like). Thus, the substrate 20 may be formed of a variety of different materials or compositions, including without limitation wood, metal, brick, plastic, fabric, fibrous sheet, glass, ceramic, concrete, plastic film/sheet, paper, medium density fiberboard, fiberglass, mineral fiber sheet, drywall, or the like. In certain embodiments the substrate 20 may be drywall that may or may not be covered with paint, wallpaper, or the like. The substrate 20 may have a flat/planar shape in certain embodiments. In other embodiments, the substrate 20 may be curved. Furthermore, the substrate 20 may be horizontal (such as when the substrate is a floor or a ceiling), vertical (such as when the substrate 20 is a wall), or oriented at an angle. In various embodiments, the exposed outer surface of the substrate 20 may be a smooth surface, a textured surface, or the like.

The adhesive tape 120 may be an integral laminate structure comprising a first substrate body 121 having a first surface 122 and a second surface 123 opposite the first surface 122 and a second substrate body 124 having a first surface 125 and a second surface 126 opposite the first surface 125. The first surface 122 of the first substrate body 121 may face the first surface 125 of the second substrate body 124. Each of the first and second substrate bodies 121, 124 may comprise a foam or paper or other material on which an adhesive material is located. Specifically, a first adhesive 130 is located on and at least partially covers the second surface 123 of the first substrate body 121. The first adhesive 130 may be adhered to the second surface 12 of the panel 10 when mounting the panel 10 to the substrate 20. Furthermore, a second adhesive 131 is located on and at least partially covers the second surface 126 of the second substrate body 124. The second adhesive 131 may be adhered to the substrate 20 when mounting the panel 10 to the substrate 20. That is, the panel 10 with the adhesive tape 120 bonded thereto may be pressed against the substrate 20 to mount or attach or couple the panel 10 to the substrate 20.

A third adhesive material 127 may be located on and at least partially cover the first surface 122 of the first substrate body 121 and the first surface 125 of the second substrate body 124. The third adhesive material 127 may adhere or bond the first and second substrate bodies 121, 124 together. The third adhesive material 127 may have a bond strength which is less than the bond strengths of each of the first and second adhesives 130, 131 so that the adhesive tape 120 separates along the third adhesive material 127 when a user attempts to remove the panel 10 from the substrate 20 after being attached thereto. Of course, in other embodiments the first and/or second adhesive materials 130, 131 may have bond strengths that are lower than the other adhesive materials of the adhesive tape 120.

Many variations to the structure of the adhesive tape 120 are possible in accordance with various embodiments of the present invention. For example, in some embodiments the adhesive tape 120 may comprise a single substrate body with adhesive material on opposing sides thereof (i.e., omitting the second substrate body 124 and the adhesive material 131). In other embodiments, the adhesive tape 120 may include additional layers of substrate material and adhesive material. In still other embodiments, rather than using the adhesive tape 120, an adhesive may be applied onto either the panel 10 or the substrate 20 prior to mounting/attaching the panel 10 to the substrate 20. This adhesive may be a liquid glue or epoxy or any double sided tape structure. In yet other embodiments, the panel 10 may be coupled or mounted to the substrate 20 with hook and loop fasteners or other similar structures which facilitate ready removal of the panel 10 from the substrate 20 when desired.

Figure 4:
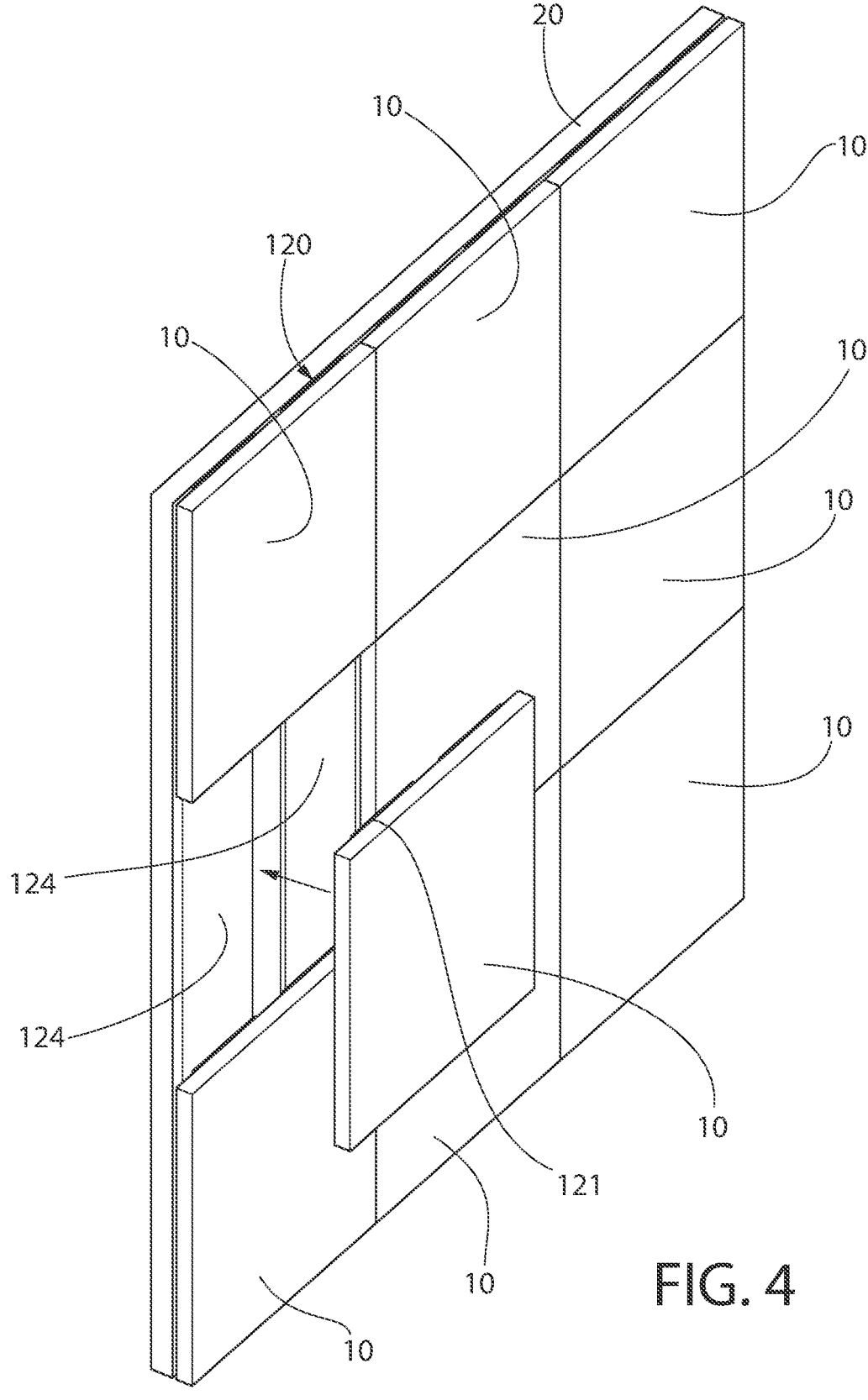
FIG. 4 is a perspective view illustrating a substrate having a plurality of the panels of FIG. 1 thereon and illustrating an additional panel being coupled to the substrate.

FIG. 4 shows an embodiment of an arrangement of a plurality of the panels 10 attached to the substrate 20. This figure shows a plurality of the panels 10 arranged in a side-by-side adjacent manner to cover the substrate 20. Of course, it may be possible to leave gaps or spaces between the panels 10 in some embodiments, although full coverage may be preferable to achieved a desired aesthetic. In this figure, the first substrate body 121 of the adhesive tape 120 is shown attached to the panel 10 and the second substrate body 124 of the adhesive tape 120 is shown attached to the substrate 20. In this figure one panel 10 is shown being mounted to the substrate 20 by engagement between the various adhesives on the panel 10 and the substrate 20. In other embodiments, the entirety of the adhesive tape 120 may be coupled to the panel 10 or to the substrate 20 prior to mounting the panel 10 to the substrate 20 (rather than having half of the adhesive tape 120 pre-mounted on the panel 10 and the other half of the adhesive tape 120 pre-mounted on the substrate 20). The panels 10 may alternatively be mounted to the substrate 20 with glue, epoxy, screws, nails, or the like.

The panel 10 may have various shapes and sizes. In certain embodiments, the panel 10 can have any desired shape. In certain embodiments, the panel 10 may be polygonal, round, or irregularly shaped. In some examples, the shape may include a circle, oval, or sector. In other example, the shape may be a triangle, square, rectangle, pentagon, hexagon, or any other polygon. For particular installations, other non-regular shapes may be required to, for example, fit around columns or other abnormalities in the ceiling and/or wall on which the panels 10 are being mounted.

Figure 5A:
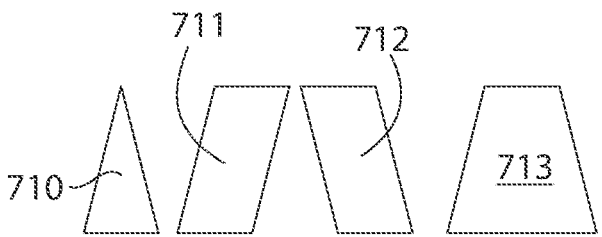
FIGS. 5A to 5C show a plurality of panels of various shapes in accordance with exemplary embodiments of the invention.

As further non-limiting examples, FIG. 5A shows a plurality of panels 710, 711, 712, 713 having different shapes. In FIG. 5A, each of the panels uses a nominal 75 degree angle with respect to a horizontal line. Other shapes having a nominal 75 degree angle can also be used such as, for example, a parallelogram shaped ceiling tile 711 or 712 having a longer or shorter base, or a trapezoid shaped ceiling tile 713 having a longer or shorter base.

Figure 5B:
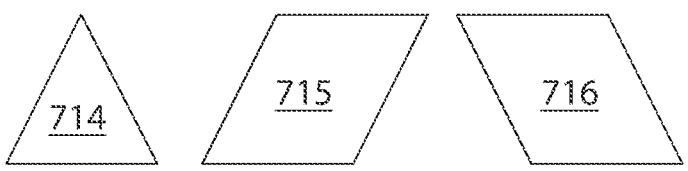

FIG. 5B shows a plurality of panels 714, 715, 716 having a shape which uses a nominal 60 degree angle with respect to a horizontal line. Other shapes having a nominal 60 degree angle can also be used such as, for example, a parallelogram shaped ceiling tile 715 or 716 having a longer or shorter base, or a trapezoid shaped ceiling tile (not shown).

Figure 5C:
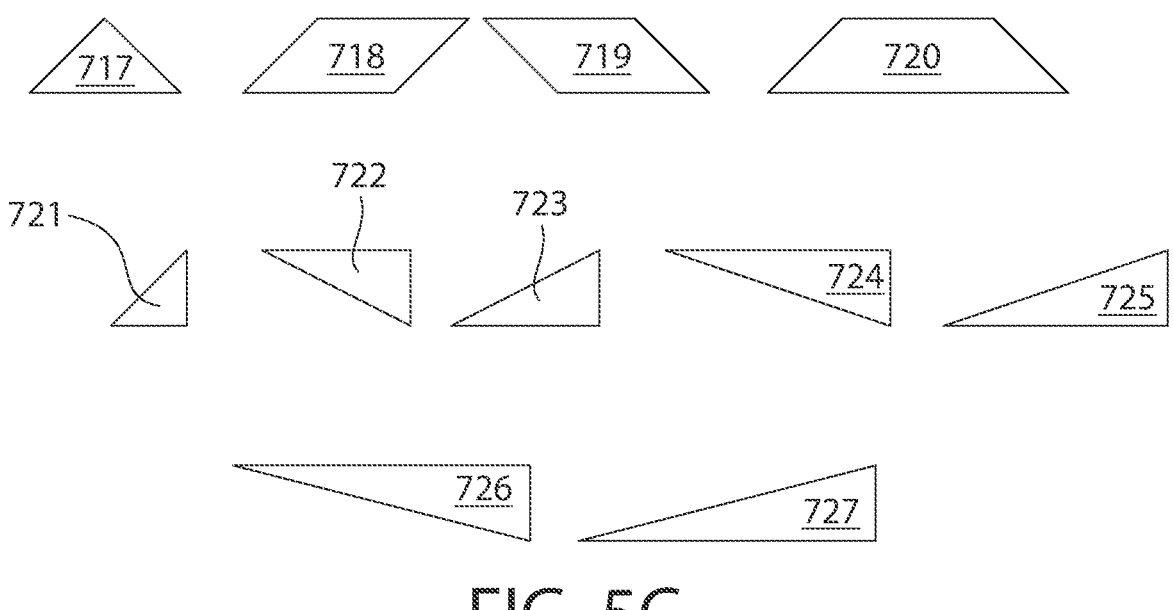

FIG. 5C shows a plurality of panels 717, 718, 719, 720, 721 having a shape which uses a nominal 45 degree angle with respect to a horizontal line. Other shapes having a nominal 45 degree angle can also be used such as, for example, a parallelogram shaped ceiling tile 718 or 719 having a longer or shorter base, or a trapezoid shaped ceiling tile 720 having a longer or shorter base. FIG. 6C also shows a plurality of panels 722, 723, 724, 725, 726, 727 having shapes which are formed with other nominal angles with respect to a horizontal line. Other shapes having other nominal angles can also be used such as, for example, a parallelogram shaped ceiling tile, or a trapezoid shaped ceiling tile. In certain embodiments, the panel may have a rectangular shape. In certain embodiments, the panel may have a rectangular shape and contain about a 45° incline from the bottom major surface to the top major surface. In such embodiments, the perimeter of the first major surface may be greater than the perimeter of the second major surface.

The size of the panels described herein may vary. In certain embodiments, the length of the panel may be from about 25 mm to about 2438 mm. In certain embodiments, the width of the panel may be from about 75 mm to about 305 mm. In certain embodiments, the distance between the first major surface and the second major surface may be from about 2 mm to about 15 mm. In certain embodiments, the distance between the first major surface and the second major surface may be about 4 mm to about 10 mm.

Figure 6:
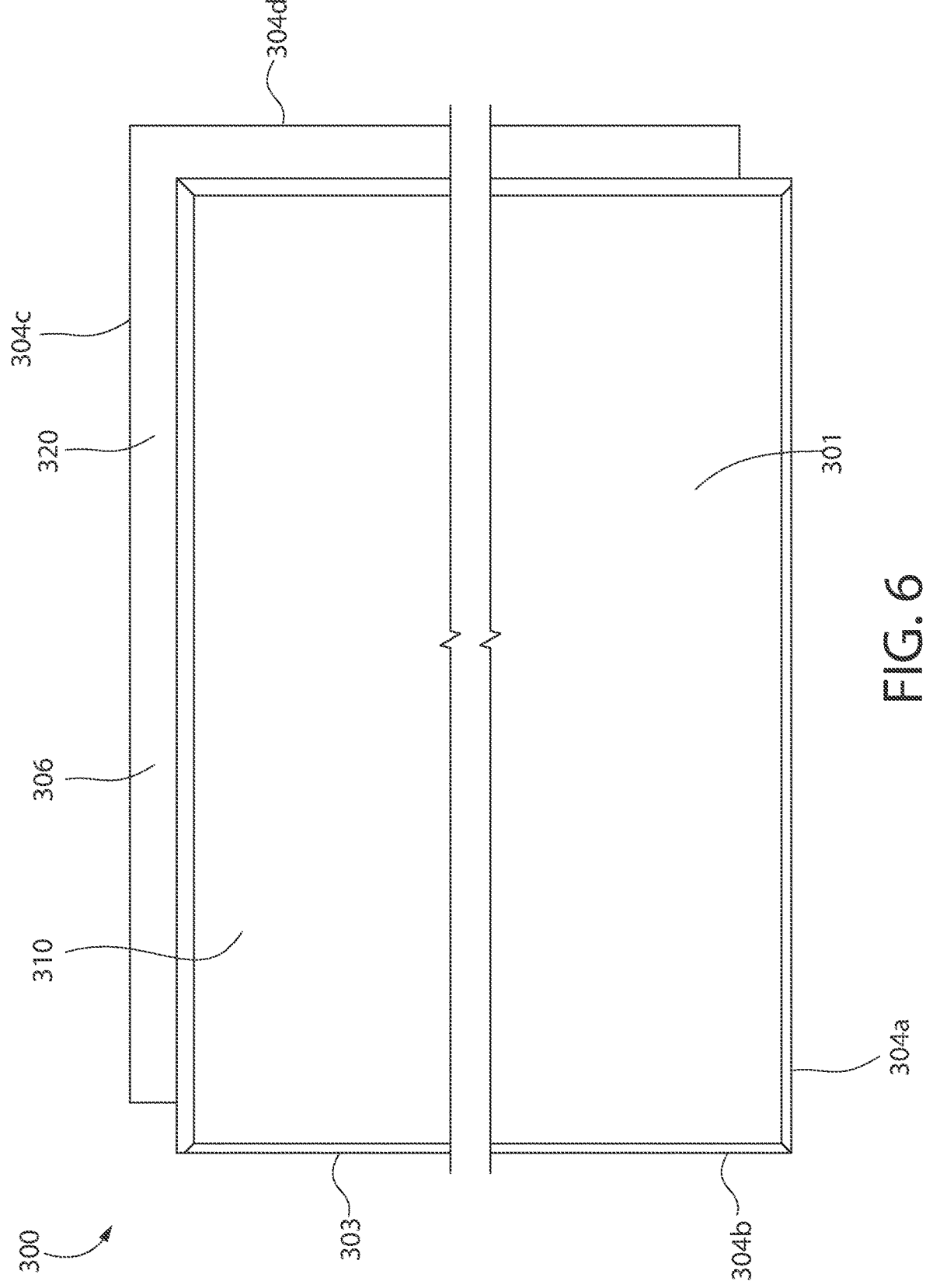
FIG. 6 is a top view of a panel according to one embodiment of the invention.
Figures 7A, 7B, 7C:
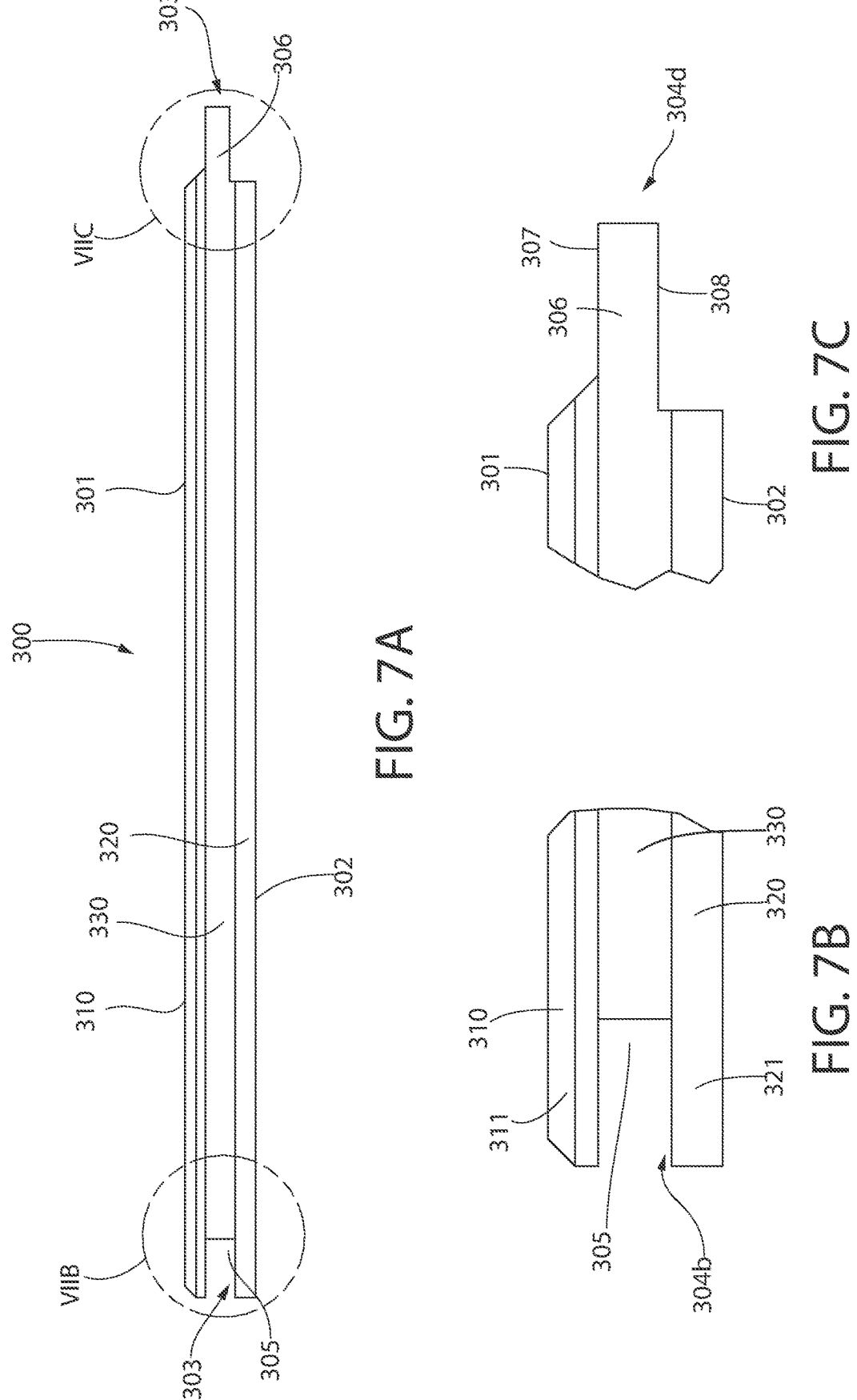
FIG. 7A is a side view of the panel of FIG. 6.
FIG. 7B is a close-up view of the area labeled VIIIB in FIG. 7A.
FIG. 7C is a close-up view of the area labeled VIIIC in FIG. 7A.

Referring to FIGS. 6-7C, a panel 300 is illustrated in accordance with another embodiment of the present invention. A plurality of the panels 300 may be mounted to a wall or a ceiling similar to that which has been shown and described with reference to FIGS. 1-5. In particular, the panels 300 may be coupled or mounted to a wall or a ceiling with an adhesive tape, a liquid adhesive, hardware such as screws and nails, or other techniques. In the exemplified embodiment, the panel 300 comprises a tongue and groove structure which facilitates a mating engagement between each pair of adjacent panels 300 to minimize or eliminate gaps between the panels 300 when mounted to a wall or ceiling.

The panel 300 comprises a top surface 301, a bottom surface 302 opposite the top surface 301, and a side surface (or side edge or peripheral edge) 303 which extends between the top and bottom surfaces 301, 302. In the exemplified embodiment, the panel 300 has a rectangular shape and as such the peripheral edge 303 of the panel 300 comprises a first edge portion 304a, a second edge portion 304b, a third edge portion 304c, and a fourth edge portion 304d. In the exemplified embodiment, second edge portion 304b is clockwise of and adjacent to the first edge portion 304a, the third edge portion 304c is clockwise of and adjacent to the second edge portion 304b, the fourth edge portion 304d is clockwise of and adjacent to the third edge portion 304c, and the first edge portion 304a is clockwise of and adjacent to the fourth edge portion 304d. In the exemplified embodiment, the first and second edge portions 304a, 304b comprise a groove 305 and the third and fourth edge portions 304c, 304d comprise a tongue 306. The tongue 306 may have an upper surface 307 and a lower surface 308.

As best seen in FIGS. 7A-7C, the panel 300 comprises a first portion 310 which comprises the top surface 301, a second portion 320 which comprises the bottom surface 302, and a third portion 330 located between the first and second portions 310, 320. In the exemplified embodiment, the first portion 310 is chamfered along the first and second edge portions 304a, 304b of the peripheral edge 303 and the first portion 310 is beveled along the third and fourth edge portions 304c, 304d of the peripheral edge 303. The first portion 310 could be squared (i.e., linear) instead of beveled/ chamfered in other embodiments.

In the exemplified embodiment, the groove 305 is formed into the third portion 330 of the panel 300 and the tongue 306 is formed as an extension of the third portion 330 of the panel 300. Thus, the first portion 310 comprises an upper overhang portion 311 that overhangs the groove 305 and the second portion 320 comprises a lower overhang portion 321 that overhangs the groove 305. That is, the first and second portions 310, 320 of the panel 300 extend further than the third portion 330 of the panel 300 along the first and second edge portions 304a, 304b thereof. Along the third and fourth edge portions 304c, 304d of the peripheral edge 303 of the panel 310, the third portion 330 of the panel 310 sticks out further than the first and third portions 310, 320 of the panel 310 to form the tongue 306. The tongue 306 may form an L-shaped extension that protrudes beyond the edge of the first and second portions 310, 320 of the panel 300.

The third portion 330 of the panel 300 may have a height measured in a direction between the first and second portions 310, 320 of the panel 300 which is between 3 mm and 5 mm, and more specifically between 4 mm and 4.5 mm. The second portion 320 of the panel 300 may have a height measured from the bottom surface 302 to the third portion 330 of the panel 300 of between 2 mm and 3.5 mm, and more specifically 2.4 mm and 3.0 mm. The groove 305 may have a depth measured from the peripheral edge 303 of the third portion 330 of the panel 300 to the peripheral edge 303 of the first and/or second portions 310, 320 of the panel which is between 5.0 mm and 10.0 mm, and more specifically between 7.5 mm and 8.5 mm.

The first portion 310 of the panel 300 may have a height measured from the top surface 301 to the third portion 330 of between 1.0 mm and 4.0 mm, more specifically between 1.25 mm and 3.0 mm, and still more specifically approximately 1.75 mm and 2.0 mm. The tongue 306 may have a thickness (measured in a direction between the upper and lower surfaces 307, 308 of the tongue 306) of between 2.0 mm and 4.0 mm, and more specifically about 3.2 mm to about 3.5 mm. The tongue 306 may protrude from the peripheral edges 303 of the first and second portions 310, 320 of the panel 300. The tongue 306 may extend past the edge of the second portion 320 of the panel 300 by a distance of between 5.0 mm and 12.0 mm, more specifically 9.0 mm to 11.0 mm, and still more specifically about 9.3 mm and 10.7 mm. The tongue 306 may extend past the edge of the first portion 310 of the panel 300 by a distance of between 5.0 mm and 10.0 mm, more specifically 6.5 mm and 8.0 mm, and still more specifically 7.0 mm and 7.5 mm. The distance from the lower surface 302 of the panel 300 to the lower surface 308 of the tongue 306 may be between 1.5 mm and 4.0 mm, and more specifically between about 2.45 mm and 3.15 mm.

While specific dimensions have been provided for various features of the panel 300, the invention is not to be limited by those dimensions in all embodiments. In certain embodiments, it is merely preferable that the tongue 306 and the groove 305 be appropriately sized and configured so that the tongue 306 of one of the panels 300 may nest within the groove 305 of another one of the panels 300 to interlock the panels 300 together and minimize gaps between the panels 300 when collectively mounted to a substrate such as a wall or ceiling. Thus, the tongues 306 and grooves 305 may have similar dimensions (height, length, width) in some embodiments.

Figure 8:
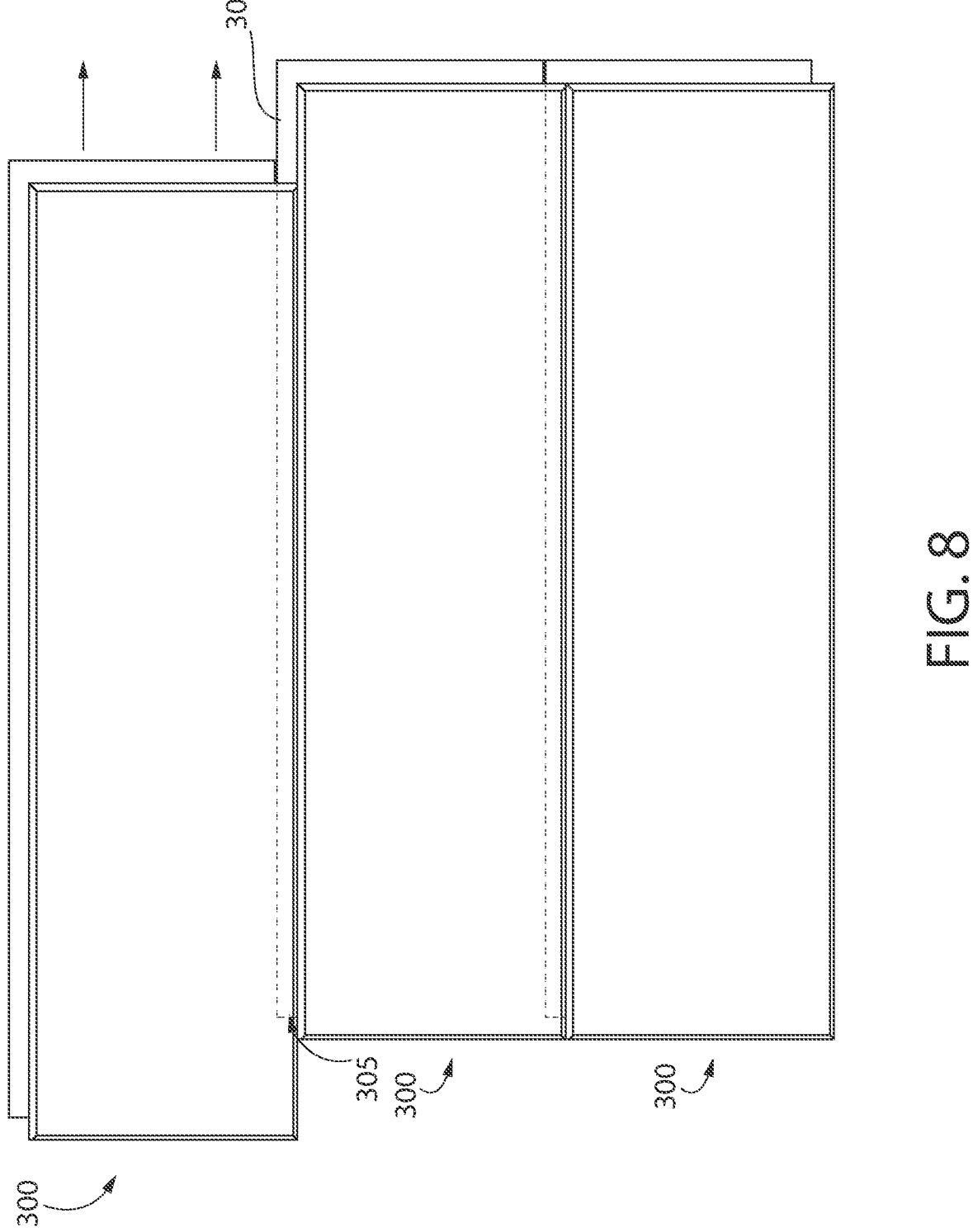
FIG. 8 is a top view of a surface covering system formed by multiple of the panels of FIG. 6 being joined together via a tongue and groove mating.

FIG. 8 illustrates a plurality (i.e., three) of the panels 300 being connected together. The panels 300 may be connected together as shown and described herein and then mounted to a substrate such as a wall or ceiling. Alternatively, the panels 300 may be connected together as they are being mounted to the substrate. When attaching the panels together 300, the tongue 306 of one of the panels 300 may be slidably inserted into the groove 305 of another one of the panels 305. That is, the panels 300 may be aligned so that the third portion 304c of the peripheral edge 303 of one of the panels 300 is adjacent to the first portion 304a of the peripheral edge 303 of another one of the panels 300. One of the panels 300 may be moved relative to the other as shown in FIG. 8 so that the tongue 306 enters into the groove 305. Alternatively, the panels 300 may be aligned so that the tongue 306 along the fourth edge portion 304d of one of the panels 300 enters into the groove 305 along the second edge portion 304b of another one of the panels 300. Regardless, this sliding movement will make sure that the panels 300 are positioned in an end-to-end abutting manner so that any gaps that exist between the adjacent panels 300 are minimal or nonexistent.

In certain embodiments, the panels 10, 300 of the invention described herein may comprise a first major surface opposite a second major surface and a side surface (or peripheral edge or side edge) extending there-between. The panels 10, 300 may comprise polyvinyl chloride present in an amount from about 45 to about 70 wt. %; carbonate present in an amount from about 10 to about 31 wt. %; stearate present in an amount from about 1 to about 6 wt. %; and aluminum hydroxide present in an amount from about 10 to about 30 wt. %. In further embodiments, the invention may be a surface covering system, wherein the system comprises a plurality of the panels 10, 300. The panels 10 may have linear edges that are positioned in an abutting manner along the surface to be covered or the panels 300 may have tongue and groove edges so that the tongue of one panel 300 nests within the groove of another panel 300 when positioned/mounted on the substrate (i.e., wall or ceiling).

In certain embodiments, the panel may be is a wall panel. In certain embodiments, the panel may be a ceiling panel. In certain embodiments, the panel may be used as both a ceiling panel and a wall panel. In certain embodiments, the panel may be used for indoor applications. In other embodiments, the panel may be utilized for outdoor applications.

The panels 10, 300 described herein may be made of varying components. In certain embodiments, the panels 10, 300 may comprise polyvinyl chloride, carbonate, stearate, and aluminum hydroxide. Of course, the panel of the invention formed from the aforementioned materials in the afore-mentioned and below mentioned amounts may have different configurations and/or structures and/or features as compared to the exemplary panels 10, 300 described herein.

In accordance with the present invention, the panel may comprise polyvinyl chloride as a component of the panel. The amount or concentration of the polyvinyl chloride may vary. The polyvinyl chloride may be present in an amount from about 45 to about 70 wt. %—including all amounts in between. For example, polyvinyl chloride may be present in an amount of about 45 wt. %, about 47.5 wt. %, about 50 wt. %, about 52.5 wt. %, about 55 wt. %, about 57.5 wt. %, about 60 wt. %, about 62.5 wt. %, about 65 wt. %, about 67.5 wt. %, or about 70 wt. %. In another example, polyvinyl chloride is present in an amount from about 45 to about 65 wt. %, from about 45 to about 60 wt. %, from about from about 50 to about 70 wt. %, from about 50 to about 65 wt. %, or from about 50 to about 60 wt. %. In further embodiments, the polyvinyl chloride is present in an amount from about 45 to about 65 wt. %, from about 47.5 to about 62.5 wt. %, or from about from about 50 to about 60 wt. %.

In accordance with the present invention, the panel may comprise carbonate as a component of the panel. One or more sources of carbonate may be utilized. In certain embodiments, the carbonate is selected from one or more of alkali metal carbonates, alkaline earth metal carbonates, and a mixture thereof. Non-limiting examples of alkali metal carbonates includes lithium carbonate, sodium carbonate, and potassium carbonate. Non-limiting examples of alkaline earth metal carbonates includes magnesium carbonate, calcium carbonate, and barium carbonate. Calcium magnesium carbonate may also be used. In certain embodiments, the carbonate is selected from sodium carbonate, potassium carbonate, calcium carbonate, calcium magnesium carbonate, iron carbonate, and mixtures thereof. In certain embodiments, the carbonate is calcium carbonate and sodium carbonate.

The amount or concentration of the carbonate may vary. The carbonate may be present in an amount from about 10 to about 31 wt. %—including all amounts in between. For example, carbonate may be present in an amount of about 10 wt. %, about 12.5 wt. %, about 15 wt. %, about 17.5 wt. %, about 20 wt. %, about 22.5 wt. %, about 25 wt. %, about 27.5 wt. %, about 30 wt. %, or about 31 wt. %. In another example, carbonate is present in an amount from about 10 to about 27.5 wt. %, from about 12.5 to about 30 wt. %, from about from about 15 to about 27.5 wt. %, from about 15 to about 25 wt. %, or from about 15 to about 22.5 wt. %. In further embodiments, carbonate is present in an amount from about 10 to about 28 wt. %, from about 12.5 to about 25 wt. %, or from about 12.5 to about 22.5 wt. %.

Where more than one carbonate source is used, the ratio of the carbonates may vary. In certain embodiments, the weight ratio of a first carbonate to a second carbonate may be from about 10:1 to about 300:1. In certain embodiments, the weight ratio of a first carbonate to a second carbonate may be from about 20:1 to about 280:1, from about 25:1 to about 250:1, from about 30:1 to about 225:1, or from about 50:1 to about 200:1. In certain embodiments, the weight ratio of alkaline earth carbonate to alkali carbonate may be from about 10:1 to about 300:1. In certain embodiments, the weight ratio of alkaline earth carbonate to alkali carbonate may be from about 20:1 to about 280:1, from about 25:1 to about 250:1, from about 30:1 to about 200:1, from about 100:1 to about 200:1, or from about 50:1 to about 100:1.

In accordance with the present invention, the panel may comprise stearate as a component of the panel. One or more sources of stearate may be utilized. In certain embodiments, the stearate may be selected from one or alkaline earth metal stearates, divalent transition metal stearates, and a mixture thereof. Non-limiting examples of alkaline earth metal stearates includes magnesium stearate, calcium stearate, and barium stearate. Non-limiting examples of divalent transition metal stearates includes zinc stearate, copper stearate, and nickel stearate. In certain embodiments, the stearate may be selected from calcium stearate, magnesium stearate, zinc stearate, copper stearate, nickel stearate, manganese stearate, and mixtures thereof. In certain embodiments, the stearate is calcium stearate and zinc stearate.

The amount or concentration of the stearate may vary. The stearate may be present in an amount from about 1 to about 6 wt. %—including all amounts in between. For example, stearate may be present in an amount of about 1 wt. %, about 1.5 wt. %, about 2 wt. %, about 2.5 wt. %, about 3 wt. %, about 3.5 wt. %, about 4 wt. %, about 4.5 wt. %, about 5 wt. %, about 5.5 wt. %, or about 6 wt. %. In another example, stearate may be present in an amount from about 1 to about 5 wt. %, from about 2 to about 5 wt. %, from about from about 2.5 to about 5.5 wt. %, from about 2.5 to about 5 wt. %, or from about 2.5 to about 4.5 wt. %. In further embodiments, stearate may be present in an amount from about 1 to about 5.5 wt. %, from about 1.5 to about 5 wt. %, or from about 1.5 to about 4.5 wt. %.

Where more than one stearate source is used, the ratio of the stearates may vary. In certain embodiments, the weight ratio of a first stearate to a second stearate is from about 1:1 to about 50:1. In certain embodiments, the weight ratio of a first stearate to a second stearate is from about 1:1 to about 45:1, from about 12:1 to about 45:1, from about 15:1 to about 40:1, from about 17:1 to about 35:1, or from about 20:1 to about 30:1. In certain embodiments, the weight ratio of alkaline earth metal stearate to divalent transition metal stearate is from about 1:1 to about 50:1. In certain embodiments, the weight ratio of alkaline earth metal stearate to divalent transition metal stearate is from about 10:1 to about 45:1, from about 12:1 to about 45:1, from about 15:1 to about 40:1, from about 17:1 to about 35:1, or from about 20:1 to about 30:1.

In accordance with the present invention, the panel may comprise aluminum hydroxide as a component of the panel. The amount or concentration of the aluminum hydroxide may vary. The aluminum hydroxide may be present in an amount from about 10 to about 30 wt. % —including all amounts in between. For example, aluminum hydroxide may be present in an amount of about 10 wt. %, about 12 wt. %, about 15 wt. %, about 18 wt. %, about 20 wt. %, about 22 wt. %, about 25 wt. %, about 28 wt. %, or about 30 wt. %. In another example, aluminum hydroxide may be present in an amount from about 10 to about 25 wt. %, from about 10 to about 20 wt. %, from about 12 to about 22 wt. %, from about from about 15 to about 25 wt. %, or from about 12 to about 28 wt. %. In further embodiments, aluminum hydroxide is present in an amount from about 10 to about 15 wt. %, from about 15 to about 20 wt. %, from about 20 to about 25 wt. %, or from about 25 to about 30 wt. %.

In accordance with the present invention, the panel may comprise one or more pigments as a component of the panel. Pigments known in the art may be used. In certain embodiments, the may be is titanium dioxide ($TiO_2$). In other embodiments, the pigment may be carbon black. The amount or concentration of the pigment may vary. The pigment may be present in an amount from about 1 to about 10 wt. %—including all amounts in between. For example, pigment may be present in an amount of about 1 wt. %, about 1.2 wt. %, about 1.5 wt. %, about 1.8 wt. %, about 2.0 wt. %, about 2.2 wt. %, about 2.5 wt. %, about 2.8 wt. %, about 3 wt. %, about 3.2 wt. %, about 3.4 wt. %, about 3.8 wt. %, about 4 wt. %, about 4.2 wt. %, about 4.6 wt. %, about 5.0 wt. %, about 5.5 wt. %, about 6.0 wt. %, about 6.5 wt. %, about 7.0 wt. %, about 7.5 wt. %, about 8.0 wt. %, about 8.5 wt. %, about 9.0 wt. %, about 9.5 wt. %, or about 10.0 wt. %. In another example, pigment may be present in an amount from about 1 to about 2.5 wt. %, from about 1.2 to about 3.8 wt. %, from about 1.2 to about 3.3 wt. %, from about from about 1.5 to about 4.5 wt. %, from about from about 3.5 to about 7.5 wt. %, from about from about 1.5 to about 9.5 wt. %, or from about 1.5 to about 4 wt. %. In further embodiments, pigment is present in an amount from about 1 to about 2.5 wt. %, from about 1.5 to about 4.5 wt. %, from about 2.5 to about 5 wt. %, from about from about 2.0 to about 8.0 wt. %, or from about 2.5 to about 4.5 wt. %.

The density of the panel may vary. In certain embodiments, the panel may be formed without a foamer. In certain embodiments, the panel may be formed with use of a foamer. Use of a foamer may yield products having low density. In certain embodiments, the density of the panel may be from about 0.3 g/cm$^3$ to about 1.5 g/cm$^3$. In certain embodiments, the panel density may be from about 0.4 g/cm$^3$ to about 0.9 g/cm$^3$. In further embodiments, the panel density may be from about 0.5 g/cm$^3$ g/cm$^3$ to about 0.7 g/cm$^3$.

In certain embodiments, the panel may be embossed. Embossment allows for enhanced visual effects of the plank. For example, various designs and visual depths may be introduced with embossment. In certain embodiments, the panel may be embossed with various patterns including, but not limited to, woodgrain, smooth or rough textures. Standard methods may be used for the embossment.

The panel (including the panels 10, 300) may be integrally formed as a monolithic component. The panel, including the panels 10, 300, may be formed via extrusion, injection molding, additive or subtractive manufacturing, or the like. The panel, including the panels 10, 300, may be embossed (or debossed) after the structure of the panel 10, 300 is formed. Specifically, the structure of the panel 10, 300 may be created, and then the panel 10, 300 may be passed through a debossing/embossing roller which creates the emboss or deboss design on the panel 10, 300. Alternatively, the panel, including the panels 10, 300, may be embossed and/or debossed during the manufacture of the panel itself.

Although the composition used to form the panel comprises fire resistance properties, in certain embodiments, the panel may comprise one or more fire retardants. In certain embodiments, the fire retardant may be selected from magnesium oxide, sodium silicate, magnesium sulfate, calcium carbonate, ammonium polyphosphate, or a combination thereof. The one or more fire retardants may be present at various amounts or concentrations. In certain embodiments, the one or more fire retardants may be present in an amount from about 50 wt. % to about 70 wt. %. In certain embodiments, magnesium oxide may be present in an amount from about 10 to about 25 wt. %. In certain embodiments, sodium silicate may be present in an amount from about 10 to about 25 wt. %. In certain embodiments, magnesium sulfate may be present in an amount from about 5 to about 10 wt. %. In certain embodiments, calcium carbonate may be present in an amount from about 5 to about 10 wt. %.

The inventive panel may be attached to a substrate, thus creating a surface covering system. Without intending to be limited, the panels may be included in a removable surface covering system using adhesive components as disclosed in U.S. Patent Application No. 2019/0270275, filed Mar. 2, 2019. For example, in certain embodiments, the invention may be a surface covering system as described herein, further comprising an adhesive tape configured to detachably couple the panels to a substrate, the adhesive tape comprising a substrate-side adhesive component comprising at least one adhesive layer; a panel-side adhesive component comprising at least one adhesive layer; and a release component; wherein the panels are detachably coupled to the substrate by the adhesive tape in a side-by-side arrangement to cover the substrate, the at least one adhesive layer of the substrate-side adhesive component being adhered to the substrate, the at least one adhesive layer of the panel-side adhesive component being adhered to the rear surfaces of the panels, and the release component being positioned between the substrate-side adhesive component and the panel-side adhesive component. In other embodiments, the surface covering system comprises an adhesive tape configured to detachably couple the panels to a substrate, the adhesive tape comprising a panel-side adhesive component comprising at least one adhesive layer; an optional substrate-side adhesive component comprising at least one adhesive layer; and an optional release component; wherein the panels are detachably coupled to the substrate by the adhesive tape in a side-by-side arrangement to cover the substrate, the at least one adhesive layer of the substrate-side adhesive component being adhered to the substrate, the at least one adhesive layer of the panel-side adhesive component being adhered to the rear surfaces of the panels, and the release component being positioned between the substrate-side adhesive component and the panel-side adhesive component.

In other embodiments, the acoustic building panel may be directly attached to a substrate using one or more attaching means. In certain embodiments, attachment may be accomplished by use of one or more of clips, screw, or adhesive. Various adhesives are known in the art. In a certain non-limiting embodiment, the adhesive may be made from synthetic rubber and resin. In certain embodiments, the synthetic rubber and resin has a viscosity of about 230,000 cps. In certain embodiments, the synthetic rubber and resin has a flash point of about –17° C. In another non-limiting embodiment, the adhesive is a water based rubber resin. In another non-limiting embodiment, the adhesive is a two component cross-linking diisocyanate waterborne emulsion. In other embodiments, the adhesive is an aqueous polyvinyl acetate emulsion. In certain embodiments, a water based adhesive using emulsion polymer isocyanate may be used. In other embodiments, a polyurethane based adhesive may be used. In some embodiments the adhesive may be a pressure sensitive adhesive, a hot melt adhesive, or a combination thereof. In some embodiments, the adhesive comprises a hot melt adhesive. In some embodiments, the adhesive comprises a pressure sensitive adhesive. In some embodiments, the adhesive comprises polyvinyl acetate. In some embodiments, the adhesive comprises ethylene vinyl-acetate (EVA).

In certain embodiments, the adhesive is applied at 3 to 30 g/ft². In certain embodiments, the adhesive is applied at 10 to 25 g/ft². In certain embodiments, the adhesive is applied at 12 to 20 g/ft². In certain embodiments, the adhesive is a two-component cross-linking diisocyanate waterborne emulsion applied at 10 to 25 g/ft². In certain embodiments, the adhesive is a two component cross-linking diisocyanate waterborne emulsion applied at 15 to 25 g/ft². In certain embodiments, the adhesive is an aqueous polyvinyl acetate emulsion applied at 8 to 25 g/ft². In certain embodiments, the adhesive is an aqueous polyvinyl acetate emulsion applied at 8 to 15 g/ft².

An important characteristic for building materials is the burning performance. ASTM E84-20 provides methods to determine the relative burning behavior of the material. In particular, ASTM E84-20 provides methods for determining the Flame Spread Index (FSI) which characterizes how far flames generated on the test material spread. The FSI is measured from 0 (indicating no flames) to 200 (which indicates spreading flames). ASTM E84-20 also provides methods for determining the Smoke Developed Index (SDI) which states how much smoke is generated. SDI is measured on a scale of 0 to 450, which correlates to no smoke generated (value of 0) to thick, heavy smoke (value of 450). Obtained FSI and SDI values are then compiled and applied to a three-tiered class system: Class A, Class B, and Class C, with Class A rated materials producing minimal to no flames or smoke, while Class C materials producing the most flames or smoke. In order to qualify as an E84 Class A fire rating, a flame spread index (FSI) of 25 or less and smoke developed index (SDI) at 450 or less must be exhibited. In certain embodiments, the plank has a flame spread index (FSI) of about 0 to about 10, as determined by ASTM E84-20. In certain embodiments, the plank has a flame spread index (FSI) of about 10 as determined by ASTM E84-20. In certain embodiments, the plank has a flame spread index (FSI) of about 0 as determined by ASTM E84-20. In certain embodiments, the acoustic building panel described herein may have a smoke developed index (SDI) of about 450, or less, as determined by ASTM E84-20. In certain embodiments, the acoustic building panel may have a smoke developed index (SDI) of about 350, or less, as determined by ASTM E84-20.

The panel described herein may have inherent beneficial characteristics. In certain embodiments, such beneficial characteristic may include resistance to mold growth. Therefore, in certain embodiments, the invention includes a method for reducing mold growth, the method comprising use of the panel as described herein. In other embodiments, the beneficial characteristic includes fire resistance. As such, in certain embodiments, the invention includes a method for providing fire resistance, the method comprising use of the panel as described herein.

EXAMPLES

The examples and other implementations described herein are exemplary and not intended to be limiting in describing the full scope of compositions and methods of this disclosure. Equivalent changes, modifications and variations of specific implementations, materials, compositions, and methods may be made within the scope of the present disclosure, with substantially similar results.

Example 1

Panels were formed by mixing components as described in Table 1. After mixing, the panels were further thermally extruded, embossed with different types of surface textures, such as smooth or grain textures, and cut into the final desired shapes and sizes. For example, a woodgrain pattern was embossed to the panel surface which provided for various designs and visual depths for decorative features. Embossment was achieved using standard methods and techniques known in the art.

TABLE 1

Example 1 panel composition.

| Component | Wt. % |
|---|---|
| Polyvinyl chloride | 45-70 |
| Calcium carbonate | 10-30 |
| Sodium carbonate | 0.1-1 |
| Aluminum hydroxide | 10-30 |
| Alkaline earth metal stearate | 1-5 |
| Divalent transition metal stearate | 0.1-1 |
| Pigment | 1-10 |

Example 2

Inventive panels according to Example 1 were characterized for performance of mold growth resistance. Briefly, samples of approximate 3" by 4" size were hung in a test chamber, according to ASTM D3273, for four weeks at about 32.5° C. and about 95% relative humidity. The test chamber contained fungal spores *Aspergillus niger, Penicillium citrinum*, and *Aureobasidium pullulans*. The front and back sides of the panels were rated according to the degree of surface defacement. The rating scale is as follows: rating 0 corresponds to 91-100% defacement; rating 1 corresponds to 81-90% defacement; rating 2 corresponds to 71-80% defacement; rating 3 corresponds to 61-70% defacement; rating 4 corresponds to 51-60% defacement; rating 5 corresponds to 41-50% defacement; rating 6 corresponds to 31-40% defacement; rating 7 corresponds to 21-30% defacement; rating 8 corresponds to 11-20% defacement; rating 9 corresponds to 1-10% defacement; and rating 10 corresponds to no, or about 0%, defacement.

Control panel A and Control panel B, which were made from mineral fiber panels, were used for comparison. Control panel A contained no biocide. Control panel B contained biocide. A further testing panel (Comparison Panel 2), which was a drywall panel not treated with biocide, was also analyzed. Average results are reported in Table 2.

TABLE 2

| | Mold growth resistance of panels. | | | |
|---|---|---|---|---|
| Panel | Week 1 Front/Back | Week 2 Front/Back | Week 3 Front/Back | Week 4 Front/Back |
| Control A | 7/8 | 2/2 | 1/0 | 0/0 |
| Control B | 10/10 | 10/10 | 10/10 | 10/10 |
| Example 1 | 10/10 | 10/10 | 10/10 | 10/10 |
| Comparison Panel 2 | 9/7 | 5/2 | 1/0 | 0/0 |

Surprisingly and unexpectedly, panels of the invention showed superior resistance to mold growth over a four week period. Panels of the invention—which did not have biocide added—provided for equivalent mold growth resistance as compared to panels containing a biocide, Control B panel.

Example 3

Inventive panels according to Example 1 were analyzed for various performance qualities. Average results are reported in Table 3. Inventive panels were compared to Control panel C, which was made from mineral Fiber, and Control panel D, which was made from medium density fiberboard.

TABLE 3

| | Performance characterization. | | |
|---|---|---|---|
| Performance Quality | Example 1 | Control C | Control D |
| ASTM E84 Class A Fire Rating | Yes | Yes | No |
| Water resistance | Good | Low | Moderate |
| Moisture resistance | Good | Moderate | Moderate |
| Washability | Good | No | Moderate |
| Durability | Good | Low | Moderate |
| Impact resistance | Good | Moderate | Good |
| Resistant to exterior weathering | Yes | No | No |
| Wood visual | Yes | Yes | Yes |
| Density/weight | Low | Low | High |
| Installation/Replacement | Easy | Moderate (fragile) | Easy to moderate (size & density) |

As shown in Table 3, panels of the invention provided for superior fire safety performance, water and moisture resistance, washability, durability, impact resistance, low density and weight, and allow for easy and simple installation and replacement. Surprisingly, panels of the invention were able to withstand exterior weathering conditions. As such, panels of the invention are improved panels which are able to be used in both indoor and outdoor applications.

While the present invention has been described with reference to several embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention is to be determined from the claims appended hereto. Further, it will be apparent to those of skill in the art that numerous changes may be made in such details without departing from the spirit and the principles of the invention.

What is claimed is:

1. A panel for covering a surface, the panel comprising: polyvinyl chloride present in an amount from 45 to 70 wt. %; carbonate present in an amount from 10 to 31 wt. %; stearate present in an amount from 1 to 6 wt. %; and aluminum hydroxide present in an amount from 10 to 30 wt. %; wherein the stearate comprises an alkaline earth metal stearate and a divalent transition metal stearate; and wherein the carbonate comprises a blend of calcium carbonate and sodium carbonate present at a weight ratio ranging from 10:1 to 300:1.

2. The panel according to claim 1, wherein the polyvinyl chloride is present in an amount from 50 to 65 wt. %.

3. The panel according to claim 1, wherein the carbonate comprises one or more of one or more alkali metal carbonates and alkaline earth metal carbonates.

4. The panel according to claim 1, wherein the carbonate comprises the blend of calcium carbonate and sodium carbonate present at a weight ratio ranging from 30:1 to 225:1.

5. The panel according to claim 1 wherein the stearate comprises alkaline earth metal stearate and divalent transition metal stearate, and wherein a weight ratio of the alkaline earth metal stearate to the divalent transition metal stearate is from 1:1 to 50:1, from 15:1 to 40:1, from 17:1 to 35:1, or from 20:1 to 30:1.

6. The panel according to claim 1, wherein the stearate comprises one or more of calcium stearate, magnesium stearate, zinc stearate, copper stearate, nickel stearate, and manganese stearate.

7. The panel according to claim 1, wherein the stearate is a mixture of calcium stearate and zinc stearate.

8. The panel according to claim 1, wherein the aluminum hydroxide is present in an amount from 10 to 25 wt. %.

9. The panel according to claim 1, wherein the panel further comprises a pigment.

10. The panel according to claim 9, wherein the pigment is titanium dioxide or carbon black, and wherein the pigment is present in an amount from about 1 to about 10 wt. %.

11. The panel according to claim 1, wherein the panel has a density of from about 0.3 $g/cm^3$ to about 1.5 $g/cm^3$.

12. The panel according to claim 1, wherein the panel is embossed with a woodgrain pattern.

13. The panel according to claim 1 wherein the panel comprises a front surface, a rear surface opposite the front surface, and a peripheral edge extending between the front and rear surfaces, the peripheral edge comprising a first edge portion, a second edge portion adjacent to the first edge, a third edge portion adjacent to the second edge portion, and a fourth edge portion adjacent to the first and third edge portions, and wherein the first and second edge portions comprise a groove and the third and fourth edge portions comprise a tongue.

14. The panel according to claim 1 wherein the panel is a ceiling panel or a wall panel.

15. A ceiling or wall covering system comprising a plurality of the panels according to claim 1 being mounted on a substrate.

16. The ceiling or wall covering system according to claim 15 wherein each of the panels comprises a peripheral edge comprising a tongue and a groove, and wherein the tongue of each of the panels nests within the groove of an adjacent panel.

17. The ceiling or wall covering system according to claim 15, further comprising an adhesive tape configured to couple the panels to the substrate.

\* \* \* \* \*